Dec. 1, 1931.   J. LEDWINKA   1,834,493
SIDE WALL CONSTRUCTION FOR PRESSED METAL VEHICLE BODIES
Original Filed Aug. 16, 1927   3 Sheets-Sheet 1

INVENTOR.
JOSEPH LEDWINKA.
BY
ATTORNEY.

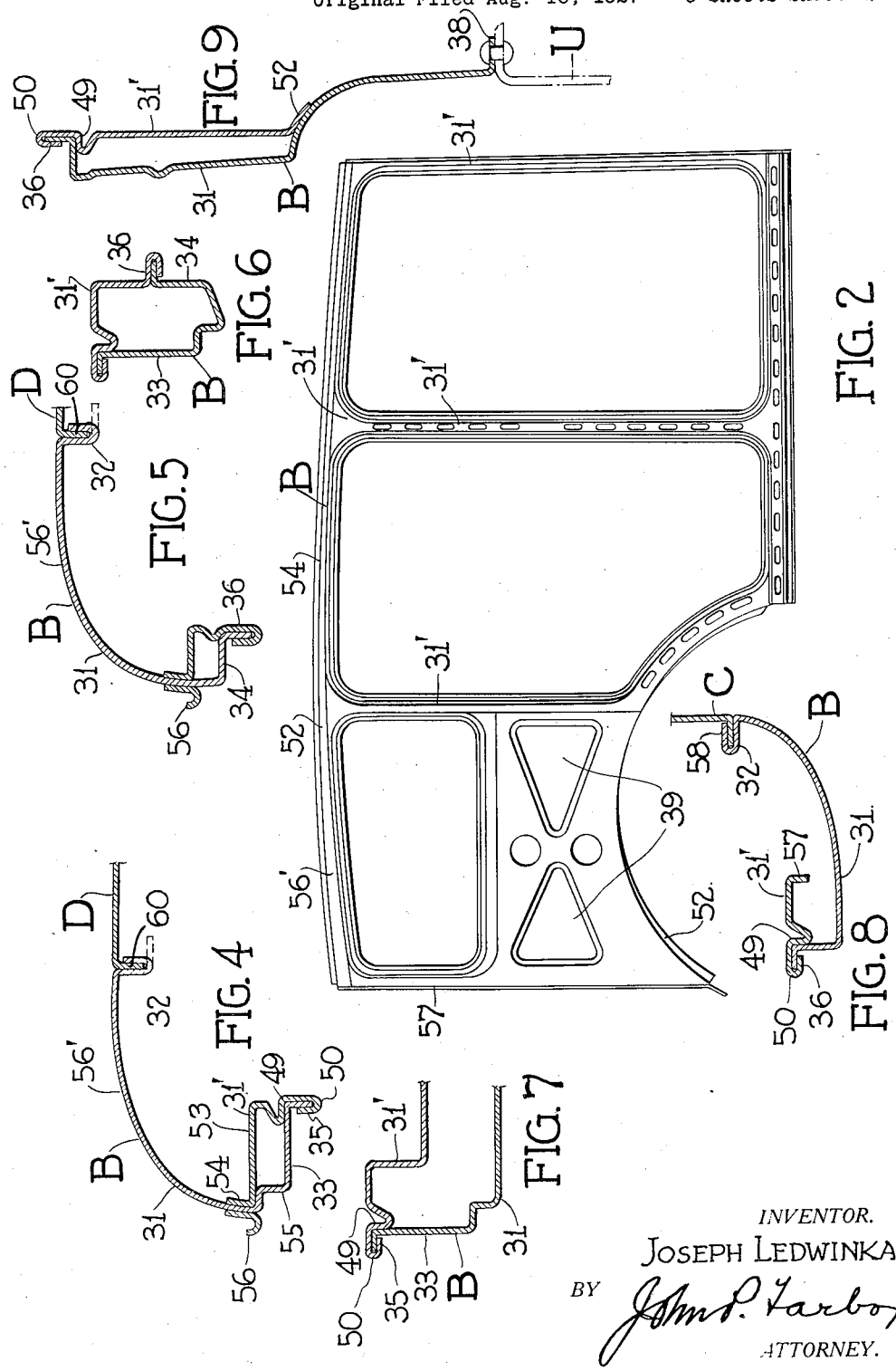

Dec. 1, 1931.  J. LEDWINKA  1,834,493
SIDE WALL CONSTRUCTION FOR PRESSED METAL VEHICLE BODIES
Original Filed Aug. 16, 1927   3 Sheets-Sheet 3
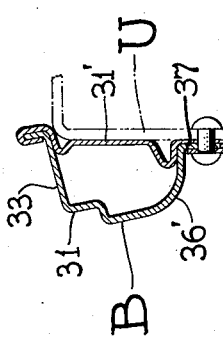
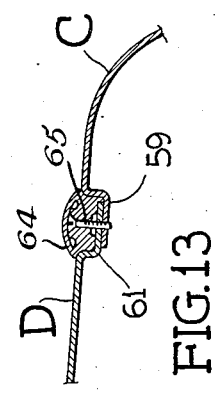
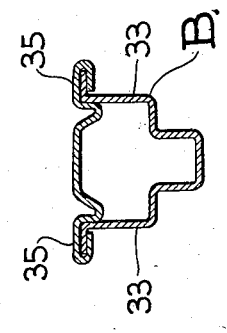
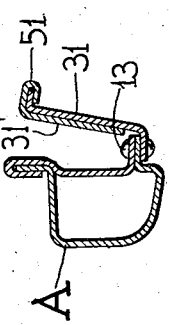
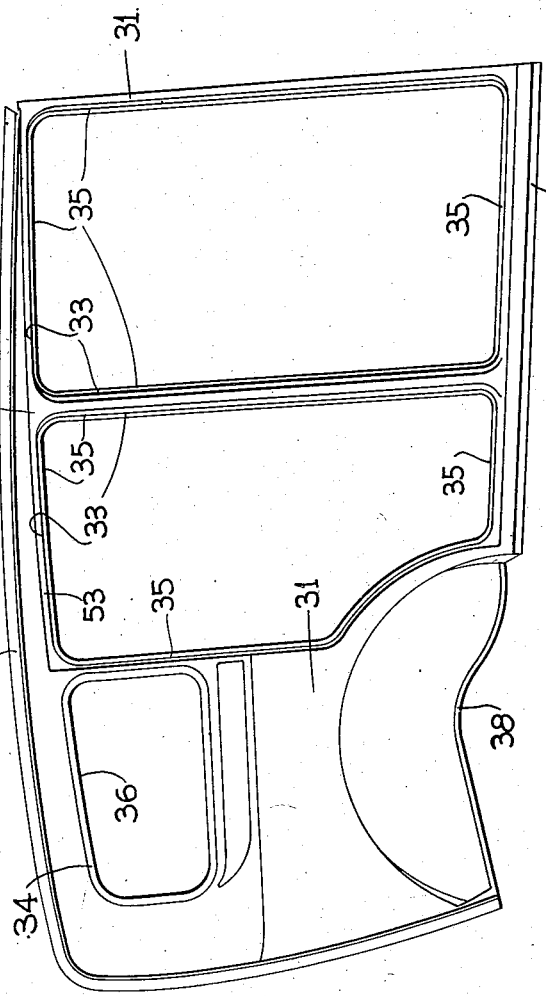
INVENTOR.
JOSEPH LEDWINKA.
BY
ATTORNEY.

Patented Dec. 1, 1931

1,834,493

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

SIDE WALL CONSTRUCTION FOR PRESSED METAL VEHICLE BODIES

Original application filed August 16, 1927, Serial No. 213,260, and in Canada October 7, 1927. Divided and this application filed December 12, 1929. Serial No. 413,495.

The invention relates to pressed metal vehicle bodies and particularly to such bodies, the walls of which are built up in large part, of unitary inner and outer panel stampings such as are disclosed, for example, in my prior application Serial No. 159,827 filed January 8, 1927, for pressed metal vehicle bodies now Patent No. 1,808,561, granted June 2, 1931.

It is an object of my invention to generally improve the superstructure unit or body proper of such bodies and to adapt it to be more readily manufactured in self-sustaining, rigid sub-assemblies, which can be handled and shipped as units without danger of damage and which can readily be joined in final assembly to form a complete unitary body superstructure which can also be handled and shipped as a unit, and can be readily upholstered and painted prior to the assembly with the underframe or chassis. This underframe or chassis may, as in the prior construction above referred to, embody all the cross braces for the lower portion of the body, and which ordinarily serve as floor and seat supports.

It is also an object of my invention to still further lighten the body superstructure by reducing the extent of the inner bracing and reinforcing paneling and to further reduce the cost of manufacture by forming certain parts in one die-stamping operation which heretofore required several operations, thus reducing both the die cost and labor costs of manufacture.

These objects are attained further by making the front section of the body superstructure a unitary sub-assembly comprised of inner and outer stampings which may be each formed from one piece of flat stock or in several pieces welded together either after they have been partially or wholly given their desired form. I prefer, however, to form each of these inner and outer stampings of such an extent, and at one die stamping operation, as to form portions of the cowl, A-posts, and upper and lower windshield headers, and to join these stampings along their edges to form in effect a substantially continuous closed hollow structure, which is extremely strong and stiff, while yet of a minimum weight. This front construction forms the subject matter of the parent application Serail No. 213,260 for automobile bodies filed August 16, 1927, of which this application is a division.

In the attainment of these objects I further make the side portions of the body superstructure as independent sub-assembly units extending from the A-post to and around the rear quarter, and so join the outer and inner panels forming this unit at the A-posts and so join it with the front unit in final assembly as to greatly strengthen the A-post structure by combining in it a closed hollow section with a channel section. I simplify the top headers above the sides of the window openings and thus reduce the extent of the inner stamping not along its edge but just above the door opening. I also reduce the extent of the inner panel at the rear by having it end at a point just in rear of the rear quarter window opening. The inner paneling is still further reduced in weight and rendered of open construction by forming it with generous openings, which permit access to the outer panel, for straightening in case of damage and also to permit the ready application or removal of the interior trim or upholstery.

Additional objects and advantages and the manner in which they are attained will become apparent from the following detailed description, when read in connection with the accompanying drawings forming a part hereof.

In the drawings:—

Fig. 2 is an inside view of an inner side panel.

Fig. 3 is a corresponding view of an outer side panel.

Figs. 4, 5, 6, 7, 8, 9, 10, 11 and 12 are detail sections taken, respectively, on the correspondingly numbered section lines as indicated in Fig. 1.

Fig. 13 is a detail section through the joint between the roof and back panels.

Figure 1:
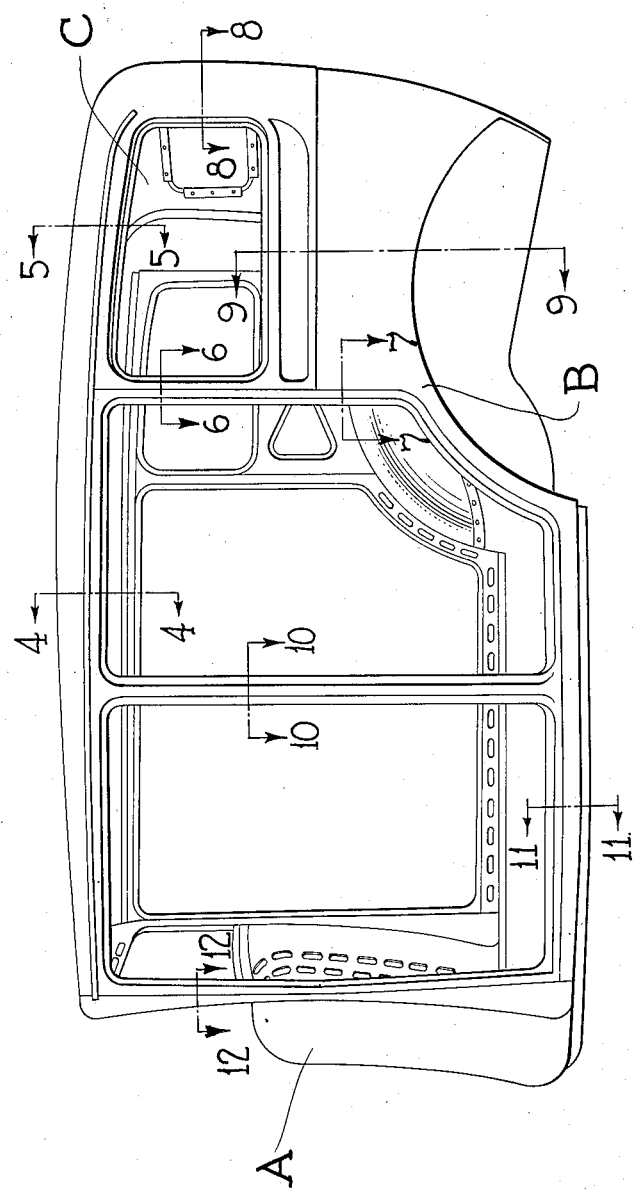
Fig. 1 is a perspective view of the complete unitary body superstructure ready to be mounted upon the underframe or chassis.

In the embodiment of my invention selected for illustration, the body superstructure is comprised of five main unitary sub-assemblies which are rigid and self-supporting in and of themselves and capable of being handled and shipped as units.

The unitary sub-assemblies comprise a front sub-assembly A, two side sub-assemblies B, a rear sub-assembly C and a top sub-assembly D. These various sub-assemblies are marginally joined together in the final assembly in a manner to be presently described to form the complete, unitary, self-sustaining, body superstructure.

The side sub-assemblies B of the improved body superstructure comprise, as in the earlier application above referred to, the outer and inner light gauge sheet metal unitary sub-assemblies which may be and preferably are each formed at one die stamping operation, the outer part 31 forming, as in the structure disclosed in the prior application Serial No. 159,827, parts of the post structures, the thresholds and the top headers, as well as side portions of the roof, and the rear quarter including the rear corner of the body. This part is substantially similar to the corresponding part in the prior application Serial No. 159,827 above referred to, being a relatively deep drawing and formed with transverse flanges around door and window openings of substantially the full depth of said openings. At the top and rear this part 31 is flanged inwardly as at 32, the edge portion of flange 32 at the top being flanged laterally to receive the edge of the roof in the angle so formed prior to final assembly. Around the doorway and window openings this part 31 is, as in the structure of the prior application, flanged inwardly at 33 and 34, respectively, and then laterally at 35 and 36, respectively, parallel to the plane of the door and window openings. At the bottom, except in the region of the wheel housing depression formed therein, part 31 is curved inwardly as at 36', Fig. 11, and then flanged downwardly at 37. In the wheel housing region part 31 is flanged inwardly at the bottom as shown at 38, Fig. 3. This flange is adapted to rest upon the top of the sill of the chassis or underframe U indicated in Fig. 9.

The inner part 31' forming with the outer part 31 the complete side assembly is shown in Fig. 2. This inner part is lightened decidedly by the provision of the lightening openings 39, yet without material sacrifice of strength. The inner part is not co-extensive with the outer, being omitted entirely at the wheel housing and in the side roof quarter, as well as in most of the region rearwardly of the side quarter window opening, thus making for additional space in those regions. This inner part 31' is relatively flat as compared with the outer part 31 and is joined to the outer panel around the door and window openings and along the bottom edge from the A-post to the wheel housing by a locked clinched joinder comprising the shoulders designated generally by numerals 49 pressed into the inner part, and arranged in opposed relation to the clinched over edges designated generally by numeral 50, of the inner part. This joinder is entirely similar to the joinder of the inner and outer parts of the front unit around the windshield opening.

At the A-post the outer part 31 is substantially Z-shape in cross section the web of the Z extending substantially at right angles to the plane of the door opening, while the inner part 31' is of angle shape, this angle nesting with the angle formed by the web and the inner arm of the Z and having its arm adjacent the inner arm of the Z crimped thereover at 51 as shown in Fig. 12. The outer arm of the Z overlaps and is joined to the front unit A at 13.

In the wheel housing region the inner part 31' is flanged inwardly at 52 and welded through this flange to the crown of the wheel housing of the outer part 31.

At the top the inner part 31' is flanged outwardly at 53 to engage in final assembly, with the outer part in the region just above the rabbet 55 above the door openings, see Fig. 4, the flange 53 being formed with a marginal upturned flange 54 which forms therewith an angle nesting within the angle formed by the upper wall of the rabbet 55 and the body of the outer part 31 thereabove. The parts are secured together along this edge as by spot welding the flange 54 to the outer part 31. Since this joint is made at the point where the drip channel 56 is usually secured, the weld spots on the outside are hidden by the channel when in place.

By this construction, a closed box section top rail is provided above the door openings, and above the rear quarter window opening while the portion of the outer part extending thereabove and curved in to form a part of the roof is not unduly stiffened and thereby yields the more readily to accommodate minor differences in the lateral dimensions of the roof section, and thus aids in the easy assembly of the roof section in the final assembly. Additionally, there is provided a space between the flange 53 of the inner part 31' and curved side roof quarter portion 56' of the outer part 31 a space which may serve a useful purpose in providing space for storing small articles. At all events this space increases the total inside air space of the body and adds to the roominess thereof.

At the rear edge, just rearwardly of the rear quarter window opening, the inner part 31' is provided with an outwardly directed stiffening flange 57. Between the edge and the edge of the outer side part 31 is provided a space similar to the space at the side quarters of the roof and which may and does serve similar purposes.

In this embodiment of the invention the rear subassembly C comprises a unitary sheet metal panel containing the rear window opening and curved inwardly at top and bottom, the top portion forming a portion of the roof, see Fig. 13, and the bottom being flanged inwardly and in final assembly forming a continuation across the back of the flanges 38 on the side sub-assemblies. The rear part C is flanged inwardly at the sides as at 58, (Fig. 8) for stiffness and for joinder to the adjacent units. At the top it has an offset flange 59 (Fig. 13) for a similar purpose.

The roof or top sub-assembly D may take a variety of forms. In the present instance, I have shown a top section comprising a sheet metal panel having flanges 60 at its sides, see Figs. 4 and 5, an offset flange 61 at its rear edge, see Fig. 13, and any suitable edge formation for attaching it to an adjacent unit at its front edge (not shown).

In the final assembly of the five main subassemblies, the front sub-assembly A and the side sub-assemblies B are strongly joined together at the A-post to form a reinforced A-post portion as described and claimed in the parent application above referred to. At the rear the side sub-assemblies B are joined to the rear sub-assembly C by welding or otherwise securing together the abutting flanges 32, 58.

The four unitary sub-assemblies so joined together form a very strong and stiff structure as they provide in effect a box whose sides are channels facing inwardly, and are sufficiently stiff and strong for handling and shipping purposes and for use, without having a top or roof section incorporated therewith having any substantial bracing strength. However, in order to obtain a very strong unitary superstructure, I prefer to employ a pressed metal roof section D, as hereinbefore described, and I may secure this in place in final assembly by welding the side flanges 60 thereon to the flanges 32 at the edges of the side sections and/or crimping the inturned flange on the side section over the roof section flange, as shown in Fig. 5.

Preferably, to assist in the ready location and alignment of the side edges of the roof section D with the adjacent edges of the side section B, the portions of the flanges 32 which are crimped over in the final assembly, are prior to such assembly extended inwardly as shown in dotted lines in Figs. 4 and 5. When the roof section is placed down upon these flanges they at once support and position the same for the final assembly.

At the rear the offset flanges of the roof and rear sections are joined, as by welding, and a finishing strip 64 of any suitable material or form is secured in the channel formed by the offset flanges as by the screws 65.

So assembled, the body superstructure forms an exceedingly light, yet strong, rigid and durable construction, which is capable of being handled and shipped as a unit and which can be very conveniently painted and upholstered and trimmed, if desired, before assembly with a suitable underframe or chassis.

In the embodiment shown, the body superstructure does not contain any bottom cross braces or seat structures, the bottom being entirely open, and being adapted to be set down upon a chassis equipped with suitable floor and seat supporting cross braces which serve also the function of the usual chassis braces. The sides of the body overlap the sides of the chassis from the front of the cowl to the wheel housing and are secured to the sills of the chassis U by riveting, as indicated in Fig. 11. In the wheel housing region and across the rear the flanges 32 rest on and are secured to the side and cross frame members of the chassis U as indicated in Fig. 9.

When so mounted and secured, the sills and cross braces of the chassis serve also as body sills and cross braces and the whole forms a vehicle body of very low center of gravity, which gives to it easy riding qualities, and one that is from 15% to 20% lighter than all metal bodies of former constructions, and yet is capable of better withstanding the shocks and stresses to which such bodies are subject than prior metal or composite bodies of which applicant is aware. The body of this invention is, like that of the earlier application hereinbefore referred to, characterized by a roominess and a beauty of line and contour not attainable with the former constructions or only with great difficulty and at large cost. With a body constructed in the manner in which the present body has been constructed, as hereinbefore described, these desirable characteristics are attained with a less material, a smaller die cost, and smaller amount of labor in forming and assembling and upholstery and trimming, all of which factors tend to greatly reduce the cost of manufacture, and enable the manufacturer to pass on this advantage to the consumer.

While I have herein described a specific embodiment of my invention, I am aware that changes and modifications may be made without departing from the spirit and scope of the invention, and the claims appended hereto are indicated to include in their scope all such changes and modifications.

What I claim and desire to secure by Letters Patent is:

1. A side wall construction for pressed metal vehicle bodies comprising inner and outer unitary stampings including all the door and window openings in the side of the body, and joined together in the margin of said openings, the inner stamping terminating at the rear short of the rear edge of the outer stamping.

2. A side wall construction for pressed metal vehicle bodies comprising inner and outer stampings extending from the bottom to the roof, the outer stamping including the side quarter of the roof, and the inner stamping terminating substantially at the lower margin of the roof quarter.

3. A side header construction for vehicle bodies comprising outer and inner stampings joined together to form a hollow structure above a door opening, the outer panel being rabbeted to receive the edge of a door, the inner panel having the edge thereof of an angle form and nested with and secured in the angle formed by said rabbet portion of the outer panel.

4. A side header construction for pressed metal vehicle bodies comprising an outer panel having a horizontal portion at the top of a door opening and an upwardly extending portion, the edge between said portions being rabbeted to receive the edge of a door, and an inner panel secured to the outer panel to form therewith a closed hollow structure above the door opening, said inner panel having an angular edge portion nested within the angle formed by a wall of the rabbet and the upwardly extending portion of the outer panel.

5. A side wall construction for vehicle bodies comprising outer and inner sheet metal stampings including a door or window opening and having the outer stamping arched inwardly above the opening to form the side quarter of the roof, and flanged inwardly above the opening, the inner stamping being joined to said flange along the margin of the opening and in its outer margin to the outer stamping at the base of the roof quarter portion thereof, to form a closed header construction above the opening and an open space between said header and the roof quarter portion of the outer stamping.

6. A side wall construction for vehicle bodies comprising an outer stamping including the rear quarter window opening and the rear quarter, and being flanged inwardly around said opening and an inner stamping joined to the outer panel through the flanges around the window opening and terminating in a vertical edge rearwardly of said opening, thereby providing an open space between said edge and the curved rear quarter portion of the outer stamping.

7. A side header construction for vehicle bodies comprising an outer panel stamping having an arched-over portion forming the side quarter of the roof, and an inwardly extending flange forming the top jamb of the closure opening, and an inner panel stamping of angle section joined through one arm of the angle to the edge of the inwardly extending flange of the outer panel and through the other arm of the angle to the outer panel in a region between the base of said flange and the arched-over portion of the outer panel, thereby forming with the outer panel a closed box section structure over the closure opening spaced from the arched-over portion forming the side quarter of the roof.

In testimony whereof I hereunto affix my signature.

JOSEPH LEDWINKA.